3,326,639
PREPARATION OF POROUS SULFUR
Richard L. Every and Ralph Leroy Grimsley, Ponca City, Okla., assignors to Continental Oil Company, Ponca City, Okla., a corporation of Delaware
No Drawing. Filed Feb. 1, 1965, Ser. No. 429,678
10 Claims. (Cl. 23—224)

This invention relates to a method of preparing porous sulfur.

In the copending application of the inventors of this invention, filed Feb. 1, 1965, and having Ser. No. 429,644, it is disclosed that finely-divided sulfur can be prepared by passing gaseous sulfur compounds, particularly $SO_2$ in combination with $H_2S$ and mercaptans, into water containing a small amount of alcohol, e.g., 0.5 to 5 weight percent.

We have now found that by further treatment, this sulfur can be cast and set to a porous sulfur mass.

There are many uses for such a porous sulfur. For example, the material would make an excellent filter media. The material is light in weight and has a low thermal conductivity, thus making it an ideal insulating material. The sulfur can be cast in place or in blocks and placed.

Porous sulfur has been prepared by heating sulfur past its melting point, introducing a foaming agent and allowing the sulfur to solidify. However, such method requires an extraneous agent and high heat.

It is, therefore, an object of this invention to provide a low cost, easily prepared porous sulfur.

According to the broad concept of this invention, sulfur is suspended in an acidic media, sufficient base is added to make the media basic and thereafter the suspension is poured into a preformed mold and allowed to solidify.

According to one aspect of this invention, a sulfur suspension is formed preferably by passing a gas containing $H_2S$ and $SO_2$ or $SO_2$ and a mercaptan into an alcohol solution in water wherein the alcohol is present in an amount between about 0.5 and about 5% by weight. Such a sulfur solution will have a pH of about 0.5. The suspension is preferably concentrated by allowing it to settle and decanting the clear liquid off. The solution is then made basic by addition of the basic material. Resulting dissolved salts due to the neutralization reaction are then preferably flushed out. The resulting mixture is then stirred and poured into suitable molds where it solidifies as a solid porous sulfur.

The dissolved salts due to the neutralization of the acid are then flushed out with water as their presence decreases the structural strength of the porous sulfur.

In general, the greater the stirring and the higher the pH, the greater will be the porosity. We have successfully prepared sulfur having porosity of from about 50 to about 80 percent void volume. As was stated in the previously mentioned invention, the normal alcohols are preferred such as methanol, ethanol, propanol, butanol, pentanol and particularly those of 1 to 3 carbon atoms. However, isomers of these alcohols are useful such as isopropanol, butanol-2, 2-methyl-propanol-1, 2-methyl-propanol-2, pentanol-2, 2-methyl-butanol-2, and the like. Also, polyalcohols such as glycol, glycerol and the like are operable so long as they are soluble in water.

The gaseous sulfur compounds can be in the pure state, mixed or in admixture with a carrier gas such as sour gas from a gas well, sulfur-containing gases from refining operations, sulfur-containing gases from sintering operations and the like.

The degree of porosity is dependent upon a number of independent factors. In general, it can be said the higher the pH, the greater the porosity. Also, the more dilution, the greater the porosity, and finally the more stirring, the greater the porosity. The degree of porosity is generally affected in that order.

In general, the sulfur suspension will be in the range of 50 to 20% although higher and lower ratios are operable. The pH must be basic and, in general, will vary from about 7 to 12, preferably 9 to 12.

The acidic sulfur suspension can be made basic by the use of any basic material such as hydroxides, as well as strong basic salts, preferably NaOH, $NH_4OH$ or KOH will be used. However, $Ba(OH)_2$, $Ca(OH)_2$ and the like are useful.

The amount of stirring should be at least sufficient to obtain an homogeneous mixture, but this is not absolutely necessary. Stirring for 5 to 10 minutes appears to improve porosity, presumably because a small amount of air is incorporated into the mixture; however, we do not want to be bound by this theory.

To further illustrate the invention, but not to be considered limiting, the following examples are given.

Example I $H_2S$ and $SO_2$ were bubbled into a 2% ethyl alcohol solution in water. Sulfur in colloidal form began to precipitate immediately. This was continued until the solution contained approximately 25% sulfur solids. The initial pH was about 0.5. NaOH was added until the pH was 11.5 while constantly stirring the solution. The stirring was continued for about 2 minutes after which the solution was poured into preformed molds. The sulfur set up in about 30 minutes, and contained about 80% voids.

Example II

The above procedure was repeated except the solution was poured into the mold immediately after the pH of 11.5 was reached. The sulfur contained about 50% voids.

Example III

The above procedure was repeated except $NH_4OH$ was used as the neutralizing base, and the final pH was about 9. The sulfur contained about 50% voids.

Example IV

Several more runs were made wherein various pH levels were tested against porosity and surface area. The results are tabulated below.

| Run No. | Base | pH | | | | | | | | | |
|---|---|---|---|---|---|---|---|---|---|---|---|
| | | 7 | | 8 | | 9 | | 10 | | 11 | |
| | | Porosity | Area* | Porosity | Area* | Porosity | Area* | Porosity | Area* | Porosity | Area* |
| 4 | NaOH | 48.2 | | 69.2 | | 64.9 | | 61.9 | | 57.0 | |
| 5 | $NH_4OH$ | 54.8 | | 57.0 | 0.79 | 60.9 | 1.30 | 60.4 | 0.18 | 79.8 | 2.70 |
| 6 | NaOH | 63.0 | | 63.3 | 0.91 | 51.3 | 0.86 | 67.7 | 0.78 | 70.4 | 0.91 |
| 7 | $NH_4OH$ | 43.0 | | 43.4 | | 53.3 | | 54.3 | | 57.9 | |

*Area in square meters per gram.

*Example V*

A porous sulfur was prepared as in Example I and poured into a Buchner filter and allowed to set. A 10% mud in water was filtered through the sulfur. The water came out without any trace of mud left.

Having thus described our invention, we claim:

1. A method of preparing porous sulfur which comprises suspending finely-divided sulfur in an aqueous media under acidic conditions, adding sufficient base to said aqueous media to increase the pH to within the range of 7 to 12, pouring the resulting solution into preformed shapes and allowing the solution to solidify.

2. The method of claim 1 wherein the pH is increased by the addition of NaOH to the solution.

3. The method of claim 1 wherein the pH is increased by the addition of KOH to the solution.

4. The method of claim 1 wherein the pH is increased by the addition of $NH_4OH$ to the solution.

5. A method of preparing solid, porous sulfur which comprises preparing a suspension of finely-divided sulfur in aqueous media under acidic conditions, adding sufficient base to the resulting suspension to increase the pH to within the range 9 to 12, stirring the solution for a predetermined time, pouring the resulting basic solution into molds and allowing the solution to solidify.

6. A method of preparing solid porous sulfur which comprises preparing a suspension of finely-divided sulfur in an acidic aqueous media containing 1 to 5 weight percent alcohol, adjusting the concentration of suspended sulfur in suspension to a predetermined level, adding sufficient base to increase the pH to within the range 9 to 12, stirring the resulting basic suspension for a predetermined time, pouring the thus prepared suspension into molds, and allowing the solution to solidify.

7. The method of claim 6 wherein said base is NaOH.

8. The method of claim 6 wherein said base is KOH.

9. The method of claim 6 wherein said base is $NH_4OH$.

10. A method of preparing solid porous sulfur which comprises
 (a) passing a gas containing $SO_2$ and a second sulfur-containing gas selected from the group consisting of $H_2S$ and mercaptans into an aqueous solution of 0.5 to 5 weight percent alcohol in water;
 (b) adding sufficient base to the resulting sulfur suspension to raise the pH to at least 7;
 (c) pouring the resulting suspension into a preformed mold; and
 (d) allowing the sulfur to solidify.

References Cited

UNITED STATES PATENTS

| | | | |
|---|---|---|---|
| 980,158 | 12/1910 | Kaiser | 106—86 X |
| 1,995,545 | 3/1935 | Leahy | 23—225 |
| 2,069,568 | 2/1937 | Wieder | 23—224 |

OTHER REFERENCES

Mellor's Modern Inorganic Chem. (1939), p. 441, section 8 relied on.

OSCAR R. VERTIZ, *Primary Examiner.*

A. GREIF, *Assistant Examiner.*